(12) United States Patent
Fleury Bellandi

(10) Patent No.: US 11,122,791 B2
(45) Date of Patent: Sep. 21, 2021

(54) CONSTRUCTIVE DEVICE APPLIED TO A NEBULIZER/SPRAY

(71) Applicant: Guarany Indústria E Comércio LTDA., Itu (BR)

(72) Inventor: Alida Maria Fleury Bellandi, São Paulo (BR)

(73) Assignee: GUARANY INDUSTRIA E COMERCIO LTDA., Sao Paulo (BR)

( * ) Notice: Subject to any disclaimer, the term of this patent is extended or adjusted under 35 U.S.C. 154(b) by 215 days.

(21) Appl. No.: 16/449,371

(22) Filed: Jun. 22, 2019

(65) Prior Publication Data

US 2020/0068867 A1 Mar. 5, 2020

(30) Foreign Application Priority Data

Sep. 3, 2018 (BR) ...................... 20 2018 067631-3

(51) Int. Cl.
| | |
|---|---|
| *A01M 7/00* | (2006.01) |
| *B05B 3/10* | (2006.01) |
| *B05B 3/04* | (2006.01) |
| *B05B 7/24* | (2006.01) |

(52) U.S. Cl.
CPC .......... *A01M 7/006* (2013.01); *A01M 7/0014* (2013.01); *A01M 7/0028* (2013.01); *B05B 3/04* (2013.01); *B05B 3/10* (2013.01); *B05B 7/2489* (2013.01)

(58) Field of Classification Search
CPC .. A01M 7/006; A01M 7/0014; A01M 7/0028; B05B 3/04; B05B 3/10; B05B 7/2489
See application file for complete search history.

(56) References Cited

U.S. PATENT DOCUMENTS

| | | | |
|---|---|---|---|
| 2,576,976 A | 12/1951 | Stagner | |
| 3,046,899 A * | 7/1962 | Biefang | .................. F02B 63/04 417/363 |
| 3,239,960 A | 3/1966 | Stevens | |
| 3,521,817 A | 7/1970 | Curtis et al. | |
| 4,992,206 A | 2/1991 | Waldrop | |
| 5,147,133 A * | 9/1992 | White | ................. B01F 13/0035 134/166 R |
| 5,299,737 A | 4/1994 | McGinnis et al. | |
| 5,937,139 A * | 8/1999 | Peterson | ................... F24H 3/04 392/307 |
| 6,257,498 B1 * | 7/2001 | Siebol | .................... A01G 13/06 239/129 |

(Continued)

FOREIGN PATENT DOCUMENTS

| | | |
|---|---|---|
| BR | PI 0810759-9 A2 | 3/2011 |
| BR | MU8902848 | 8/2011 |

*Primary Examiner* — Viet Le
(74) *Attorney, Agent, or Firm* — Lambert Shortell & Connaughton; David J. Connaughton, Jr.; Justin P. Tinger

(57) ABSTRACT

An arrangement introduced into a motorized nebulizer equipped with a pneumatic nozzle for generating cold drops, which allows for the high efficiency of the application through the formation of a droplet spectrum within the range of sizes recommended by the World Health Organization (WHO) for the control of insects, in particular, mosquito vectors of human diseases, in flight, which is a spectrum with a median volumetric diameter (MVD) of less than 30 microns (μm).

1 Claim, 2 Drawing Sheets

(56) References Cited

U.S. PATENT DOCUMENTS

| | | | |
|---|---|---|---|
| 6,837,447 B1 * | 1/2005 | Clark | A01M 7/0003 |
| | | | 239/142 |
| 9,771,953 B1 * | 9/2017 | Vaselaar | F04D 17/16 |
| 2004/0217199 A1 | 11/2004 | Bryan et al. | |
| 2012/0193458 A1 | 8/2012 | Wheeler et al. | |
| 2014/0306030 A1 | 10/2014 | Omiatek et al. | |
| 2018/0064091 A1 * | 3/2018 | Clarke | A01M 7/0082 |

* cited by examiner

CONSTRUCTIVE DEVICE APPLIED TO A NEBULIZER/SPRAY

CROSS REFERENCE TO RELATED APPLICATIONS

This application claims the benefit of BR 20 2018 067631-3, filed 3 Sep. 2018, herein fully incorporated by reference.

BACKGROUND OF THE INVENTION

1. Field of the Invention

A constructive arrangement introduced into a motorized nebulizer/spray equipped with a pneumatic nozzle to generate cold drops, which allows for the high efficiency of the application, through the formation of a droplet spectrum within the range of sizes recommended by the World Health Organization (WHO) for the control of insects.

2. Description of Related Art

Sprays comprised by the generation of droplet spectrum with a median volumetric diameter (MVD) of less than 50 µm and, typically used at rates that characterize the application as ultra-low volume (ULV) are commonly used in the control of insect vectors of human diseases, particularly mosquitoes, such as those of the genus *Aedes* spp., *Anopheles* spp., *Lutzomya* spp., etc. In this context, nebulizers for use on vehicles (vehicle nebulizers) such as pickup trucks (pick-ups) and/or lorries, generally for the control of urban pests, have long formed part of the state of the art.

Early methods for forming droplets used thermal energy, such as the equipment disclosed in U.S. Pat. Nos. 2,576,976 and 3,239,960. These were followed by more elementary versions of systems for the generation of cold drops, such as U.S. Pat. No. 3,521,817. More recently, versions of the so-called vehicular nebulizers for the generation of cold drops were developed—with different types of nozzles/spouts (pneumatic, centrifugal energy, etc.) presenting identical or similar configurations to what is found on the market today, which can be seen in U.S. Pat. No. 4,992,206, US Patent Publication Nos. 2004/0217199 and 2014/0306030, and BR Patent Application No. PI 0810759-9 A2.

The latter are characterized by having an engine as part of their basic configuration, generally a combustion engine, a compressor or blower, a pump, a tank for storing the chemical mixture, a nozzle/spout and a chassis to support all of these previously cited components and a connection to the luggage rack of high-capacity motor vehicles.

Moreover, within the scenario of equipment with the same objective of control (urban insect pests), but of smaller size, which is to say, greater ease of movement, one can find equipment such as US Patent Publication No. 2012/0193458, which has a wheeled system for transportation/loading, allowing it to be hauled by trucks or even by tractors during operation, which, thus, presents some ease of movement, but which still possesses considerable dimensions and mass in relation to the proposed device.

There are also even smaller devices. However, these are common in agricultural environments, such as U.S. Pat. No. 5,299,737. As a rule, they are used for phytosanitary treatments in greenhouses/glasshouses, where they are manually controlled, and for use in smaller areas/confined spaces and, thus, are not suitable for use in operations for the control of urban pests, especially mosquitoes.

In the present invention, a major structural difference—which, consequently, allows for a significant reduction in the cost of the product, in comparison with the nebulizers for use on motor vehicles commonly used in the market—is the dimensioning of components designed for the dispersion and formation of droplets appropriate to the objective of the application, without the need to use an air compressor/blower or a liquid pump—components which are common in the state of the art.

This differentiated system was only possible due to the simultaneous operation of two small 2-stroke engines with power of 4.6 HP (3.4 kW) each—most commonly used in back-mounted/portable sprays—with independent fan systems for the generation of air, but which are joined, through an interconnection of their air discharge systems, before arrival at the nozzle/spout of the spray.

This combination was designed following studies of the droplet spectra, using the laser beam diffraction method, generated by the arrangement found in BR Patent No. MU8902848-1, owned by the same owner as the present invention—where it was possible to visualize the optimization of the performance of the MU8902848-1 intended to obtain MVDs of droplets more suited to the control mosquitoes in flight, both in relation to the useful improvement that operates in the motorized, back-mounted spray, for which it was designed, and the vehicular nebulizer traditionally commercialized on the market, containing an 18 HP engine, with a compressor/blower with a capacity of approximately 595 m$^3$/hour (at a pressure of 1 Opsi) and a piston pump with electrical activation.

BRIEF SUMMARY OF THE INVENTION

Briefly described, in preferred form, the present invention comprises a nebulization device intended to provide a simplified functional system, with a small number of components, a more compact structural design, with a reduced weight (kg) and high efficiency in the formation of droplets, in comparison with the non-portable vehicular nebulizers currently commercialized on the market for the control of insect vectors of human diseases. As such, the present invention seeks to provide ease of use, ease of mobility in operation and loading, versatility in relation to the options of support structures/vehicles for its use, and also an economically viable alternative for low-income/restricted-budget cities.

The present invention reveals a new constructive arrangement introduced into a motorized nebulizer/spray equipped with a pneumatic nozzle to generate cold drops, which allows for the high efficiency of the application, through the formation of a droplet spectrum within the range of sizes recommended by WHO for the control of insects—in particular mosquito vectors of human diseases—in flight, which is a spectrum with an MVD of less than 30 microns (µm).

In addition to this, the present invention aims to provide a compact solution, of low weight (complete empty weight of a maximum of 50 kg), reduced size and with a small number of components, in order to enable ease of loading—easily transported by two people—and versatility of transportation during operations, allowing for it to be fixed on small utility vehicles or even adapted vehicles.

Consequently, this results in a more economical option for use in campaigns for the control of vector insects in low-income municipalities, where budgetary restrictions prevent the acquisition of traditional vehicular nebulizers that require larger vehicles (pickup trucks/trucks) for their transportation. Moreover, this arrangement makes it possible to access marginal areas that are difficult to reach, and where traditional vehicular nebulizers often fail to go, but without loss of operational performance, which is extremely important in situations of epidemics involving the target insects, and in contrast to what occurs with the use of portable sprays (manual/back-mounted), which were formerly the only option in the absence of those transported by pick-up trucks.

In an exemplary embodiment, the present invention is a portable nebulization device comprising a first motor-fan assembly operative to produce air flow, a second motor-fan assembly operative to produce air flow, a tank configured to contain nebulization solution, an outlet, and a fan discharge assembly configured to combine the air flows from the motor-fan assemblies into a single discharge air flow, direct a first portion of the discharge air flow directly into the tank, and direct a second portion of the discharge air flow to the outlet.

In another exemplary embodiment the present invention is a portable nebulization device is a portable nebulization device comprising a first motor-fan assembly operative to produce air flow, a second motor-fan assembly operative to produce air flow, a drive unit to drive the first and second motor-fan assemblies, a tank configured to contain nebulization solution, an outlet, and a fan discharge assembly configured to combine the air flows from the motor-fan assemblies into a single discharge air flow, direct a first portion of the discharge air flow directly into the tank, and direct a second portion of the discharge air flow to the outlet.

In each of these embodiments of the invention, the outlet can comprise an internal venturi-type arrangement to enable suction of a portion of nebulization solution in the tank into the second portion of the discharge air flow. The first portion of the discharge air flow can assist in pressurizing nebulization solution in the tank. The first motor-fan assembly can further comprise a first cowl configured to allow the channeling of the first motor-fan assembly air flow to the fan discharge assembly. The second motor-fan assembly can further comprise a second cowl configured to allow the channeling of the second motor-fan assembly air flow to the fan discharge assembly. An upper portion of the tank can comprise an air intake valve assembly. The fan discharge assembly can direct the first portion of the discharge air flow directly into the upper portion of the tank through the air intake valve assembly.

Further, in the additional exemplary embodiment, the drive unit can ensure the joint functioning of the first and second motor-fan assemblies such that if one of the motor-fan assemblies switches, the drive unit switches the other motor-fan assembly off.

In another exemplary embodiment the present invention is a constructive arrangement applied to a nebulizer/spray containing a nozzle for the atomization of drops characterized by the fact that it is structured in a metal chassis with tubular contours that form handles, containing a fixed flat base, which provides a support for the tank for transporting a chemical solution, which possesses a curved cylindrical format and a nominal capacity of 30 liters with an auxiliary agitation system positioned in the lid of its nozzle and activated by a lever and, at its base, a manual valve to facilitate emptying.

It further comprises two flat sheet metal bases fixed to the chassis by means of a nut and screw, which allow for the fixing, in a vertical position, of two motor-fan assemblies equipped with engines of the two-stroke type. The assemblies possess, at each end of their bases, vibration cushioning pads and, in their upper parts, there is a spring cushioning system fixed to a metal structure that encompasses the entire diameter of the tank.

The fans can be protected/enveloped by a cowl, the cowl being connected to the discharge system through a tubular outlet and also connected by a hose (not represented in the image) to an outlet in the cowl of the fan and to a valve fixed to the tank. The entire assembly can be supported on four anti-vibration shoes located below the chassis. The air discharge system has an individualized outlet for each motor-fan assembly and also possesses a coupling along the course to the nebulization nozzle/spout of the pneumatic type.

The present invention can also contain an electric control, with voltage of 12V DC, connected to a battery, and which can be connected to a remote control. The control also comprises an electro-electronic valve and a micro-controller connected to a solenoid valve.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which.

DETAILED DESCRIPTION OF PREFERRED EMBODIMENTS

Figure 1:
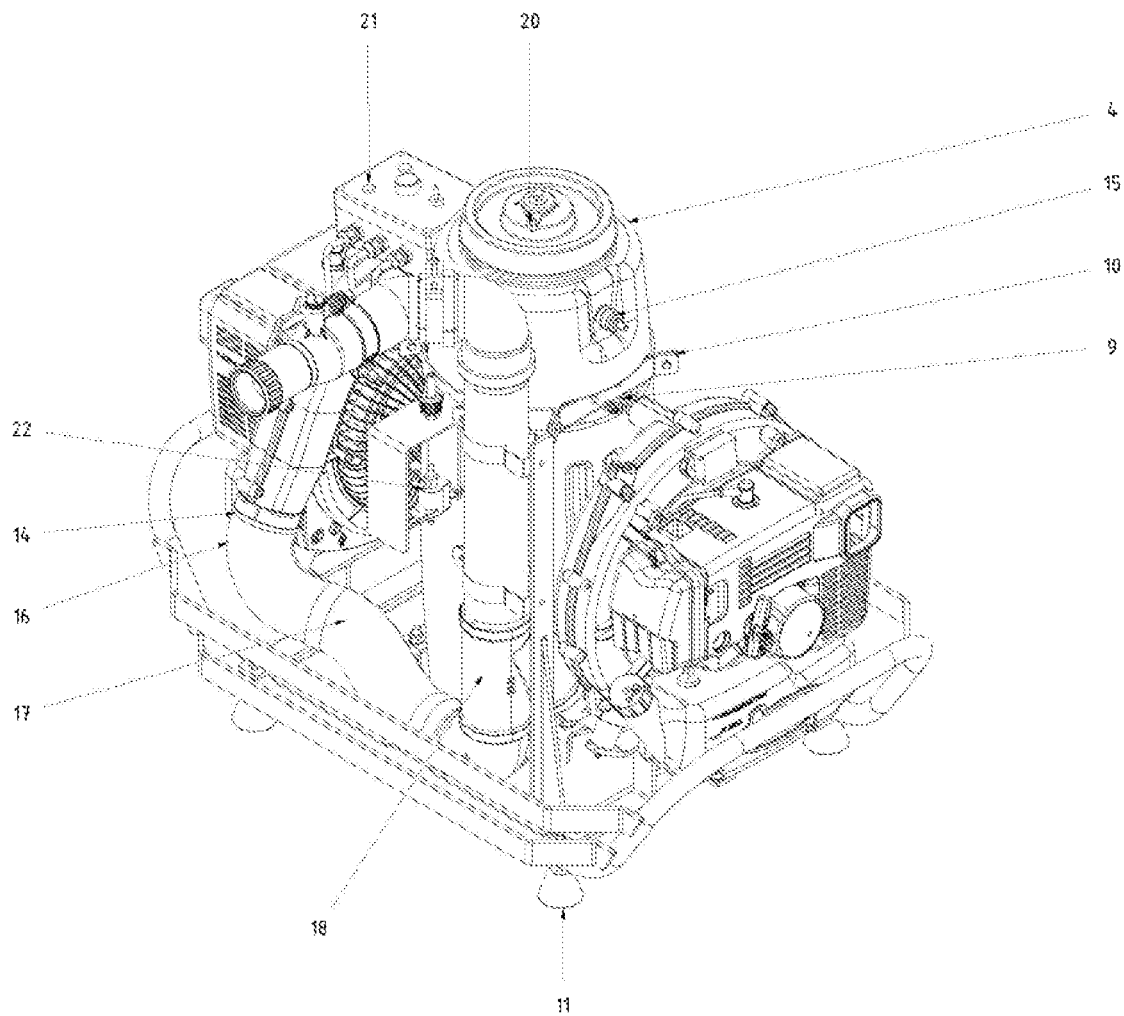
FIG. 1 illustrates a perspective view of the complete constructive arrangement, highlighting the outlet side of the nebulization nozzle/spout.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Figure 2:
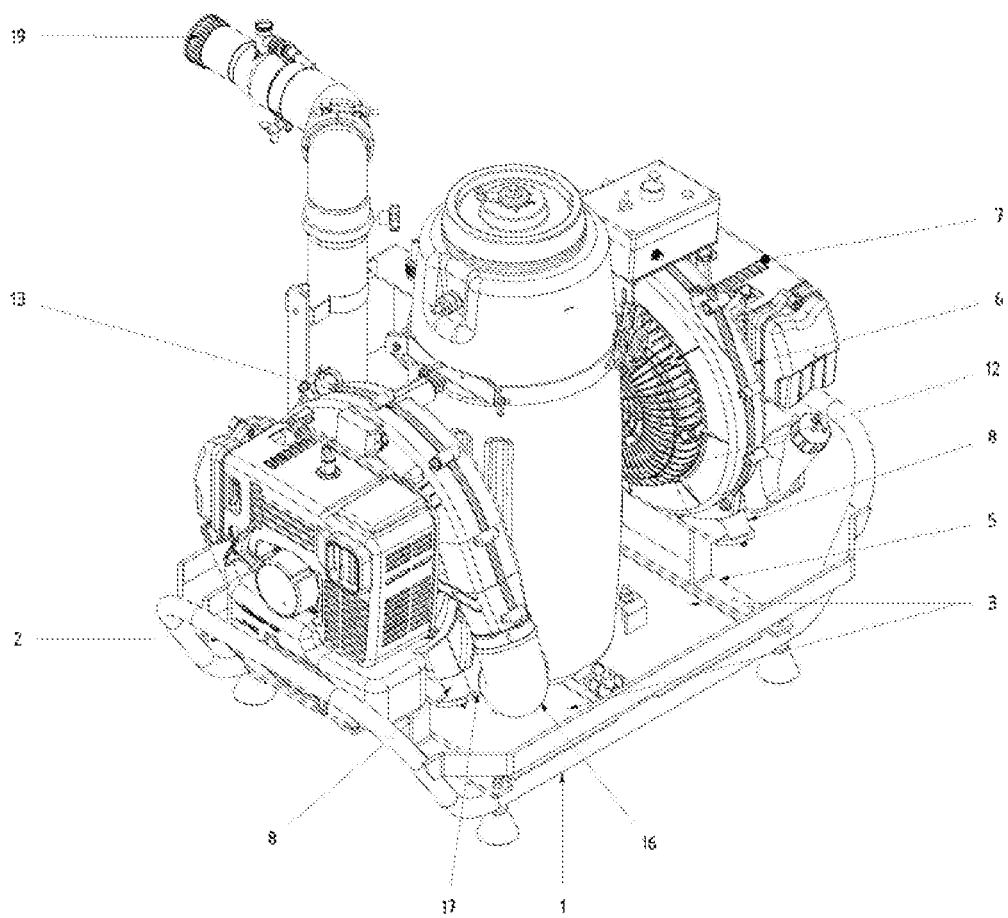
FIG. 2 illustrates a perspective view of the complete constructive arrangement, highlighting the opposite side to that of FIG. 1.

In accordance with FIGS. 1 and 2, it is observed that the arrangement comprises a chassis 1 that can be made of metal, with tubular contours, forming at its ends, in the longitudinal direction, handles 2 allowing for manual loading and transportation, where the base of the chassis 1 is almost completely occupied by a metal structure permanently fixed to the tubular structure and flat in shape 3, on which is supported the tank for transportation of the chemical solution in a chemical solution tank 4 which is the component with the greatest mass, in kilograms, when filled to the nominal capacity of the assembly.

Fixed, by means of a nut and bolt, to the tubular structure of the chassis, are two flat sheet metal bases 5, which allow for the fixing, in a vertical position, of two motor-fan assemblies 6, 7, which comprise two 2-stroke engines 7 with a power of 4.6 HP (3.4 kW). The motor-fan assemblies 6, 7 possess at each end of their bases, vibration damping pads 8, scaled to join the flat metal base 5 to the assembly. In the upper part of each motor-fan assembly 6, 7, there is a spring damping system 9 fixed to a metal structure 10 that encompasses the entire diameter of the chemical solution tank 4 and is positioned in the upper third of the tank.

The complete assembly was designed to be supported on four anti-vibration shoes 11, located below the chassis 1.

The fan 6, an integral part of the motor-fan assembly 6, 7, connected to the motor 7 through the axis thereof (not represented in the drawing), is protected/enveloped by a cowl 12 that allows for the channeling of the air that is generated/blown to a discharge system 13 through a tubular outlet 14 located in the lower part of the cowl, and a small fraction of the air generated is transferred to assist in the pressurizing of the chemical solution tank 4, by means of an outlet located in the upper part of the cowl 12 that is connected, through a hose (not represented in the drawing), to a valve 15 in the upper part of the tank 4, emitting air into the tank 4, in order to assist in the transference of liquid from the tank 4 to the application outlet. The air discharge system has an individualized outlet 16, 17 for each motor-fan assembly 6, 7, but has a coupling 18 along the course to the nebulization nozzle/tip 19 in order to improve the performance thereof in relation to the size of the droplets generated and the dispersion of the droplet cloud.

The tank 4 for storage of the chemical solution to be applied, of a domed cylindrical shape, has a nominal capacity of 30 liters and, its lid for sealing the upper nozzle has an auxiliary system for agitating the liquid solution, which comprises a lever 20 with three positions (0, I and II), where position 0 (zero) corresponds to closed agitation, position I to gentler agitation and, position II, to more vigorous agitation. Additionally, it has a manual opening/closing valve in its lower part with the aim of facilitating the emptying of the solution from the tank 4 whenever necessary.

The generation of the droplets is performed using a nebulization nozzle/spout 19 of the pneumatic type, described and revealed in MU8902848-1, originally developed for the formation of droplets within the spectrum of size considered as aerosols (<50 microns), which, as previously mentioned, had its performance optimized by this constructive arrangement, in order to generate a spectrum of droplets with the sizes recommended by WHO for the control of insects, in particular mosquito vectors of human diseases, in flight, which is an MVD of less than 30 microns ($\mu$m). Additionally, this nozzle/spout 19, supported by its internal 'venturi' type arrangement, which assists in the suction of the stored liquid and, moreover, in the control of the flow variation through the interchangeable restrictors/inserts installed in the upper part of the nozzle, renders it unnecessary to install a liquid pumping device in the system.

The assembly also possesses an electrical control 21 for controlling the principal operational functions. The control 21 operates at a voltage of 12V DC and has a cable for connecting to a battery (not represented in the image) or even to a connection/switch of the same voltage, for example, as those found in automotive vehicle cabins. To facilitate operation, there is a remote control (not represented in the image) which, using a power cord (not represented in the image), can be connected to the control 21 of the machine and then brought close to the operating position, generally the cabin of an automotive vehicle. Using the drive unit of the machine or its remote control, it is possible to connect or interrupt the flow of the chemical solution to the nebulization nozzle/spout 19. In addition to this, the drive unit 21 has an electro-electronic valve that ensures the joint functioning of the two engines. As a result, if one engine 7 switches off, the other automatically switches off in order to preserve the operating parameters pre-established by the manufacturer of the engine 7 and, consequently, its working life.

Finally, the drive unit 21 also has a micro-controller that is synchronized with the rotational patterns (RPM) recommended by the engine manufacturer and ideal for obtaining the droplet spectra for which this arrangement was designed. Thus, if the rotation falls to values below those pre-established, the system automatically closes the chemical solution circuit by means of a solenoid valve 22 installed in the hose for carrying the solution to the nozzle/spout 19.

While particular embodiments have been described in this description, it is to be understood that other embodiments are possible and that the invention is not limited to the described embodiments and instead are defined by the claims.

What is claimed is:

1. A portable nebulization device comprising:

a metal chassis with tubular contours that form handles, a fixed flat base, and anti-vibration shoes located below said chassis;

a first motor-fan assembly operative to produce air flow;

a second motor-fan assembly operative to produce air flow;

a tank configured to contain nebulization solution;

a vibration system for the motor-fan assemblies, each vibration system including vibration cushioning pads and a spring cushioning system, the cushioning pads positioned at a lower portion of each motor-fan assembly, and the spring cushioning system positioned at an upper portion of each motor-fan assembly and fixed to the tank;

an electric control including an electro-electronic valve and a micro-controller connected to a solenoid valve;

an outlet; and a fan discharge assembly configured to:

combine the air flows from the motor-fan assemblies into a single discharge air flow;

direct a first portion of the discharge air flow directly into the tank; and direct a second portion of the discharge air flow to the outlet;

wherein the tank is a curved cylindrical tank supported on the fixed flat base of the metal chassis, the tank having at a lower portion a valve to facilitate emptying and at an upper portion a lid, equipped with an auxiliary agitation system, being activated by a lever, and capable of agitating nebulization solution in said tank;

wherein the first portion of the discharge air flow assists in pressurizing nebulization solution in the tank;

wherein the first motor-fan assembly further comprises a first cowl configured to allow the channeling of the first motor-fan assembly air flow to the fan discharge assembly;

wherein the second motor-fan assembly further comprises a second cowl configured to allow the channeling of the second motor-fan assembly air flow to the fan discharge assembly;

wherein each motor-fan assembly comprises a two-stroke engine and a cowl for the fan;

wherein each motor-fan assembly is fixed in a vertical position by means of flat sheet metal bases fixed to the chassis;

wherein an upper portion of the tank comprises an air intake valve assembly;

wherein the fan discharge assembly directs the first portion of the discharge air flow directly into the upper portion of the tank through the air intake valve assembly.

* * * * *